3,393,215
POLYMERIC GERMANIUM SULFUR COMPOUNDS

Kurt Moedritzer, Webster Groves, and John R. Van Wazer, Ladue, Mo., assignors to Monsanto Company, St. Louis, Mo., a corporation of Delaware
No Drawing. Filed Dec. 28, 1964, Ser. No. 421,633
10 Claims. (Cl. 260—429)

ABSTRACT OF THE DISCLOSURE

The present invention relates to polymeric germanium and sulfur containing compounds of the dihydrocarbyl germanium sulfide type having the general formula:

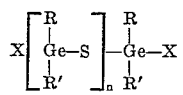

in which R and R' are alike or different, and are selected from the group consisting of hydrocarbyl radicals having from 1 to 20 carbon atoms, X is a halogen, and $n$ has a value of 1 to 100. These compounds have utility as sources of hydrogen sulfide, as functional fluids, and as starting materials for use in the production of germanium-containing polymers.

---

The present invention relates to novel polymeric germanium and sulfur containing compounds of the dihydrocarbyl germanium sulfide type, particularly to linear chain molecular configurations thereof.

According to the invention, there are provided new and valuable germanium sulfur compounds having the general formula:

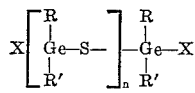

in which R and R' are alike or different, and are selected from the group consisting of hydrocarbyl radicals having from 1 to 20 carbon atoms, such as saturated and unsaturated alkyl and cycloalkyl radicals having from 1 to 20 carbon atoms, and phenyl and substituted phenyl radicals having from 6 to 20 carbon atoms; X is a halogen such as fluorine, chlorine, bromine and iodine as well as alkoxyl, thioalkyl, dialkylamino and cyano, and $n$ has a value of 1 to 100 or preferably $n$ has a value of 1 to 10. For example, when $n=1$, and $R=R'=CH_3$ the chlorine-substituted product is a linear dimer with 2 Ge atoms, for example

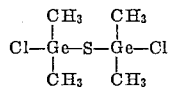

having a molecular weight of 308, or when $n=2$, and $R=R'=CH_3$ the product is a trimer with 3 Ge atoms

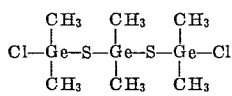

having a molecular weight of 443.

Dihydrocarbylgermanium sulfide compounds have been heretofore limited to ring types of molecular configurations, for example

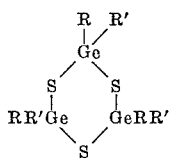

where R and R' have the meaning set forth above. However the ring compounds have not yielded polymeric materials.

The general method of preparation of the novel chain type polymeric dihydrocarbyl germanium sulfides utilizes a di-substituted dihydrocarbyl germane and a trimeric cyclo dihydrocarbyl germanium sulfide. The germane material such as a di-substituted dialkyl germane is reacted with the trimeric cyclohydrocarbyl germanium sulfide in the preferred proportion of 1:0.03 to 1:17. The mixture of the two components undergoes reaction at a temperature of from 10° C. to 300° C. The chain type polymeric germanium sulfides which result exist as dimeric, trimeric, tetrameric, pentameric, hexameric, heptameric, octameric, nonameric, decameric and higher forms, e.g., up to 100 for the value of $n$; however a preferred range is $n=1$ to $n=10$. As an example, hexaethyltrigermanium trisulfide is reacted at 200° C. with dichlorodiethyl germane to obtain linear polymers of alpha, omega-dichloropolydiethyl germanium sulfide. As another specific example of a desirable material, alpha, omega-dichloropolydiphenyl germanium sulfide is obtained by heating and mixing together dichloro diphenyl germane with trimeric cyclic diphenyl germanium sulfide at a temperature of about 200° C.

The linear polymeric products can be distilled from the reaction mixture after first distilling off unreacted reactants. However, the products are generally obtained as mixtures of polymers which may be used in the form of mixtures for certain industrial applications.

The dihydrocarbylgermanium sulfide starting material such as trimeric diphenyl germanium sulfide is prepared by reacting diphenyl dichlorogermane with hydrogen sulfide in an inert solvent.

The reaction is preferably conducted in a closed vessel, although the use of relatively high boiling starting materials, e.g., a boiling point of at least 200° C. for the germane starting material, permits the use of an open vessel.

While the germane and germanium sulfide components described above react without a catalyst, it has been found that Lewis acid type catalysts provide a faster reaction to obtain the present products. For example, aluminum chloride, boron trifluoride, zinc dichloride, ferric tribromide and antimony pentachloride are representative catalysts which are useful in the present process.

The aforesaid reactants are preferably sealed into a reaction vessel using an inert atmosphere such as nitrogen gas. The reaction tubes are then maintained at a temperature in the range of from 10° C. to 300° C. for a period of time of from 1 hour to 200 hours, with the higher temperatures providing a shorter reaction time. If desired a solvent such as benzene, ether, or hexane may be employed, although a solvent is not essential. The polymeric products of the present invention have good stability.

The following examples illustrate specific embodiments of the present invention.

Example 1.—The preparation of the methyl substituted polymeric germanium sulfide is shown in the present example. A pressure tube is charged with 1 mole of dimethyl dichlorogermane together with ⅓ of a mole of hexamethyl trigermanium trisulfide. The tube containing this mixture is sealed under nitrogen, and is then heated in a tube furnace at 120° C. The progress of the reaction is followed by withdrawing the tube from the furnace from time to time and measuring the presence of the desired polymeric reaction products having the general formula

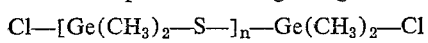

by proton nuclear magnetic resonance. The table shows the relationship of dimeric and higher polymeric products.

| Ratio (CH₃)₂GeCl₂ to [(CH₃)₂GeS]₃ | Percent Dimer | Percent Trimer and higher polymers |
| --- | --- | --- |
| 1:2.33 | 55 | 45 |
| 1:1 | 65 | 35 |
| 1:0.55 | 70 | 30 |
| 1:0.33 | 73 | 27 |
| 1.67:0.33 | 83 | 17 |
| 3:0.33 | 60 | 40 |
| 7:0.33 | 40 | 60 |

In order to separate the desired chain compounds up to the decameric form and higher from the reaction mixture, various separation procedures such as chromatographic adsorption and distillation are employed. Distillation is preferably carried out under vacuum conditions. For example, the dimeric compound

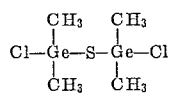

has a boiling point of approximately 50° C. at 0.1 mm. pressure.

The trimeric compound

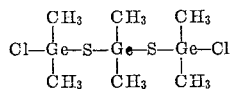

shown above has an approximate boiling point of 70° C. at 0.01 mm. pressure. Separation of the dimer and trimer is readily carried out by distillation.

Identification of the molecular characterization of the chain compositions of the present invention is conducted by the following procedure. The dimer is identified by the proton nuclear magnetic resonance spectrum with a single peak at −1.092 p.p.m. The trimer gives proton nuclear magnetic resonances at −1.053 and −1.023 p.p.m. in the calculated ratio of 2:1 for methyl groups on germanium in terminal groups versus middle groups.

The trimeric cyclodimethylgermanium sulfide shows a single sharp proton nuclear magnetic resonance peak at −0.893 p.p.m. The resonance for the dimethyldichlorogermane is seen at −1.67 p.p.m. The reaction product of the reaction of dimethyl dichlorogermane and trimeric dimethylgermanium sulfide shows in addition to the two resonances seen above, peaks at −1.092, −1.053 and −1.045 p.p.m. From the fact that these three peaks form a cluster of signals lying between those of the two starting materials, and the variation of their relative intensities with the relative composition of the two reactants, particularly the maximization of these peaks at the 1:⅓ mole ratio (CH₃)₂GeCl₂ versus trimer dimethylgermanium sulfide, these three signals are assigned to end groups in germanium sulfur chains. This is confirmed by a mathematical treatment assuming random ligand exchange of chlorine and sulfur atoms on the dimethylgermanium moiety. Additional peaks at −1.023, −1.017, −1.003, −0.992, −0.947 and −0.855 are attributed to various types of middle groups in chains.

Example 2.—The use of a methoxy group as a substituent in the products and process of the present invention is shown by following the procedure of Example 1, using dimethoxy diethylgermane having the formula (CH₃O)₂Ge(C₂H₅)₂

This reagent is used with hexaethyl trigermanium trisulfide as the germanium sulfur component in the ratio of 10 moles of hexaethyl trigermanium trisulfide, and 1 mole of dimethoxy diethylgermane. The products show a greater proportion of the higher polymeric forms such as the tetramer in comparison to Example 1 above, e.g., the maximum amount of tetramer obtained as a white solid is between 20% and 40% based upon the germanium in such tetramer relative to the total germanium in the polymeric products. The reaction products also include higher polymeric forms such as the pentamer, hexamer, octamer, etc., e.g.,

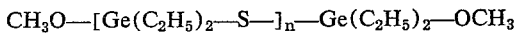

The various polymeric forms are soluble in benzene, carbon disulfide, hydrocarbon and chlorocarbon solvents such as carbon tetrachloride.

Example 3.—The use of phenyl groups as a substituent in the products and process of the present invention is shown by following the procedure of Example 1, using dichloro diphenyl germane having the formula (C₆H₅)₂GeCl₂ to obtain the ultimate product

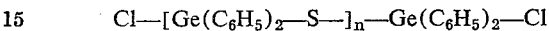

The reactant is used with hexaphenyl trigermanium trisulfide as the germanium sulfur ring in the ratio of 5 mols of hexaphenyl trigermanium trisulfide and 1 mole of dichloro diphenyl germane. The reaction products also include higher polymeric forms such as the pentamer, hexamer, octamer, etc.

The various polymeric forms are soluble in benzene, carbon disulfide, hydrocarbon and chlorocarbon solvents such as carbon tetrachloride.

Example 4.—The use of an unsaturated group as a substituent in the products and process of the present invention is shown by following the procedure of Example 1, using di(methylmercapto) divinylgermane in the presence of 1% AlCl₃ catalyst with cyclic

[(CH=CH₂)₂GeS]₃

The reaction products also include higher polymeric forms such as the pentamer, hexamer, octamer, etc., e.g.,

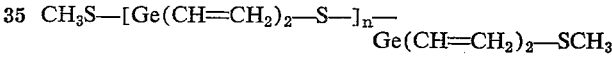

The various polymeric forms are soluble in benzene, carbon disulfide, hydrocarbon and chlorocarbon solvents such as carbon tetrachloride, and are separated by column chromatography. In the present example the major products are the dimer, trimer and tetramer of alpha, omega-dimethylmercaptopolydivinyl germanium sulfide.

The polymeric germanium sulfides of the present invention particularly the unsaturated alkyl types have utility as monomeric starting materials for use in the production of germanium containing polymers, and are particularly desirable for use in copolymerization with unsaturated hydrocarbon monomers such as vinyl chloride, vinyl acetate, styrene, acrylonitrile, butadiene, etc. Silicone monomers may also be copolymerized with the present germanium sulfides. Other germanium containing compounds such as RGeX₃, for example CH₃GeCl₃, C₆H₅Ge(OCH₃)₃

C₂H₅Ge[(N(CH₃)₂)]₃ and CH₂=CHGe(SC₂H₅)₃, may also be used in copolymers of the present linear polymeric germanium sulfides to give higher molecular weight copolymers. The polymerization is effected by conventional methods such as are known in the manufacture of silicone polymers.

The germanium sulfide compounds of the present invention, particularly the phenyl substituted compositions are also of utility as insecticides. These compounds upon exposure to atmospheric conditions slowly release hydrogen sulfide gas, aiding in the insecticidal activity. For example

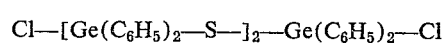

when used as a synergistic additive in a standard synergistic test using a mixture of three components which themselves show no activity, e.g. the above polymeric germanium compound used with N-methyl-alpha-naphthyl carbamate and O,O-dimethyl-S-(1,2-dicarbethoxy ethyl) dithiophosphate, and 1,1-bis-para chlorophenyl-2,2-dichloroethane exhibits pronounced activity against mosquito larvae.

The polymeric germanium sulfides of the present invention, particularly the trimeric and higher polymeric forms are also useful as functional fluids. In this relationship the pronounced thermal stability of such compositions provides for long life of the functional fluids. The ability of the above described germanium sulfides to slowly release hydrogen sulfide in an aqueous solution also gives a convenient solid starting material to provide controlled proportions of hydrogen sulfide in various preparation reactions.

What is claimed is:

1. Chain germanium sulfides having the general formula

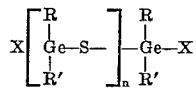

in which R and R' are alike or different radicals selected from the group consisting of hydrocarbyl radicals having from 1 to 20 carbon atoms, X is selected from the group consisting of fluorine, chlorine, bromine, iodine, alkoxy, thioalkyl, dialkylamino and cyano; and $n$ has a value of 1 to 100.

2. The linear polymeric compositions

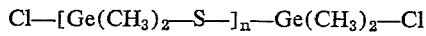

where $n$ is a whole number from 1 to 10.

3. The linear polymeric compositions

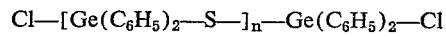

where $n$ is a whole number from 1 to 10.

4. The linear polymeric compositions

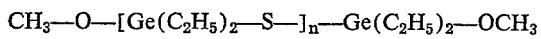

where $n$ is a whole number from 1 to 10.

5. The linear polymeric compositions

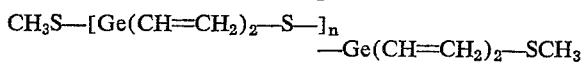

where $n$ is a whole number from 1 to 10.

6. The process for preparing a linear polymeric germanium sulfide having the formula

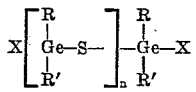

in which R and R' are alike or different, and are selected from the group consisting of hydrocarbyl radicals having from 1 to 20 carbon atoms; X is selected from the group consisting of fluorine, chlorine, bromine, iodine, alkoxy, thioalkyl, dialkylamino and cyano; and $n$ has a value of 1 to 100, which comprises mixing and heating R R'GeX$_2$ together with a cyclic dihydrocarbyl germanium sulfide trimer, [R R'GeS]$_3$.

7. The process for preparing a linear polymeric germanium sulfide having the formula

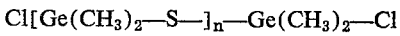

where $n$ is 1 to 100, which comprises mixing and heating together (CH$_3$)$_2$GeCl$_2$ and the cyclic germanium sulfide trimer [(CH$_3$)$_2$GeS]$_3$ and thereafter separating the linear chain products from the reaction mixture.

8. The process for preparing a linear polymeric germanium sulfide having the formula

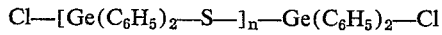

where $n$ is 1 to 100, which comprises mixing and heating together (C$_6$H$_5$)$_2$GeCl$_2$ and the cyclic trimer

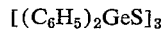

and thereafter separating the linear chain products from the reaction mixture.

9. The process for preparing a linear polymeric germanium sulfide having the formula

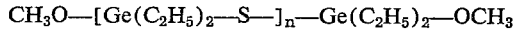

where $n$ is 1 to 100, which comprises mixing and heating together (C$_2$H$_5$)$_2$Ge(OCH$_3$)$_2$ and the cyclic trimer

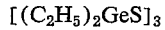

and thereafter separating the linear chain products from the reaction mixture.

10. The process for preparing a linear polymeric germanium sulfide having the formula

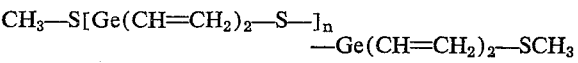

where $n$ is 1 to 100, which comprises mixing and heating together (CH=CH$_2$)$_2$Ge(SCH$_3$)$_2$ and the cyclic trimer [(CH$_3$=CH)$_2$GeS]$_3$ and thereafter separating the linear chain products from the reaction mixture.

References Cited

UNITED STATES PATENTS

| | | | |
|---|---|---|---|
| 2,467,177 | 4/1949 | Zimmer | 252—75 |
| 2,506,386 | 5/1950 | Rochow | 260—429 |
| 3,344,161 | 9/1967 | Moedritzer et al. | 260—448.8 |

TOBIAS E. LEVOW, *Primary Examiner.*

A. P. DEMERS, *Assistant Examiner.*

UNITED STATES PATENT OFFICE
CERTIFICATE OF CORRECTION

Patent No. 3,393,215

July 16, 1968

Kurt Moedritzer et al.

It is certified that error appears in the above identified patent and that said Letters Patent are hereby corrected as shown below:

Column 3, before the table, insert -- DISTRIBUTION OF POLYMERS IN THE PRODUCT OF THE REACTION OF DIMETHYLDICHLOROGERMANE WITH TRIMERIC DIMETHYLGERMANIUM SULFIDE --. Column 4, line 18, "mols" should read -- moles --. Column 6, line 1, "alkoxy" should read -- alkoxyl --.

Signed and sealed this 10th day of March 1970.

(SEAL)
Attest:

M. Fletcher, Jr.

Attesting Officer

WILLIAM E. SCHUYLER, JR.

Commissioner of Patents